Aug. 26, 1969 G. P. R. FARR 3,463,054
FLUID PRESSURE OPERATED BOOSTERS OR SERVO MOTORS
Original Filed Nov. 18, 1965     3 Sheets-Sheet 1

Aug. 26, 1969 G. P. R. FARR 3,463,054
FLUID PRESSURE OPERATED BOOSTERS OR SERVO MOTORS
Original Filed Nov. 18, 1965 3 Sheets-Sheet 2

United States Patent Office 3,463,054
Patented Aug. 26, 1969

3,463,054
FLUID PRESSURE OPERATED BOOSTERS OR SERVO MOTORS
Glyn P. R. Farr, Kenilworth, England, assignor to Girling Limited, Tyseley, England, a British company
Continuation of application Ser. No. 508,429, Nov. 18, 1965. This application Jan. 30, 1968, Ser. No. 704,943
Claims priority, application Great Britain, Nov. 18, 1964, 46,884/64
Int. Cl. F15b 9/10, 13/042; F01b 19/02
U.S. Cl. 91—369                               10 Claims

ABSTRACT OF THE DISCLOSURE

In a fluid pressure booster a lever formed by a part of a movable wall is adapted to fulcrum on another part of the movable wall at a point spaced from the axis of the booster, and an input member aligned axially on the axis of the booster with an output member acts on the output member through the lever.

DETAILED DESCRIPTION

This application is a continuation of Ser. No. 508,429, Nov. 18, 1965, now abandoned.

This invention relates to improvements in fluid-pressure operated boosters or servo motors of the kind in which power is generated by the application of differential fluid pressures to opposite sides of a movable wall under the control of valve means.

Such boosters are used, for example, in the braking systems of vehicles, the pressure differential being that between atmosphere and a source of vacuum, such as the induction manifold of the engine of the vehicle, or between a source of compressed air and atmosphere.

According to the present invention in a fluid pressure booster comprising a housing, a force input member acting on an output member through a lever in the housing, a wall mounted in the housing and movable in response to differential fluid pressure upon energisation of the booster to augment the input force applied to the output member, and a valve member to control the development of the pressure differential actuated upon movement of the input member, the movable wall acts upon the lever at a first position coinciding with the centre of pressure of the movable wall and the input member acts on the lever at a second position, the lever at a position spaced between the first and second positions being adapted to rock about a fulcrum formed by the engagement between the lever and the output member, and the input and output members are in axial alignment on the axis of the booster, and the lever is formed by a part of the movable wall and is adapted to move angularly about a fulcrum on another part of the movable wall at a point spaced from the axis of the booster.

In one construction the lever comprises a beam or plate carried by or forming part of a diaphragm of which one side is at all times under a constant pressure and the other side is exposed to the pressure in the power chamber of the booster.

The plate or beam is engaged by the force input member at a point lying on the opposite side of the fulcrum from the centre of pressure of the diaphragm.

The plate or beam may be biassed by a light spring urging it in a direction opposed to that in which it is moved by the actuating member.

When the booster is energised the lever rocks about the fulcrum and applies a reaction or "feel" on the force input member opposing the force applied by the force input member, the reaction or "feel" being dependent upon the magnitude of the pressure differential development across the movable wall.

Two embodiments of our invention are illustrated in the accompanying drawings in which.

Figure 1:
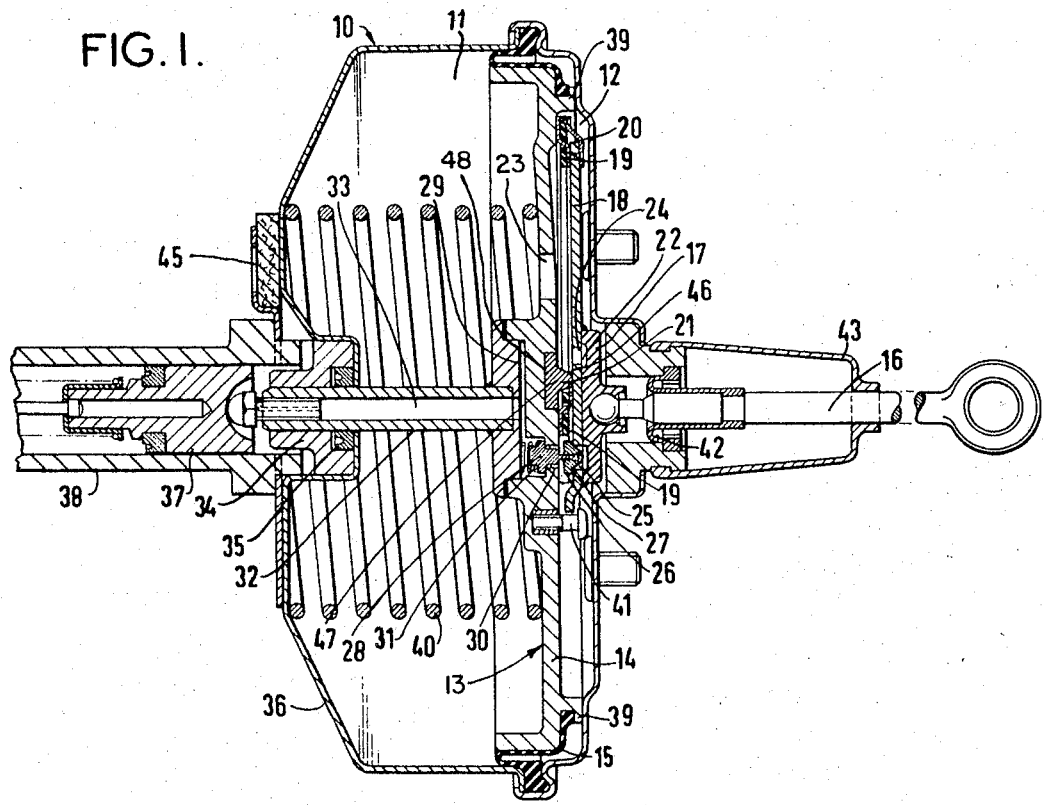
FIGURE 1 is a longitudinal section of a booster of the vacuum suspended type.
Figure 3:
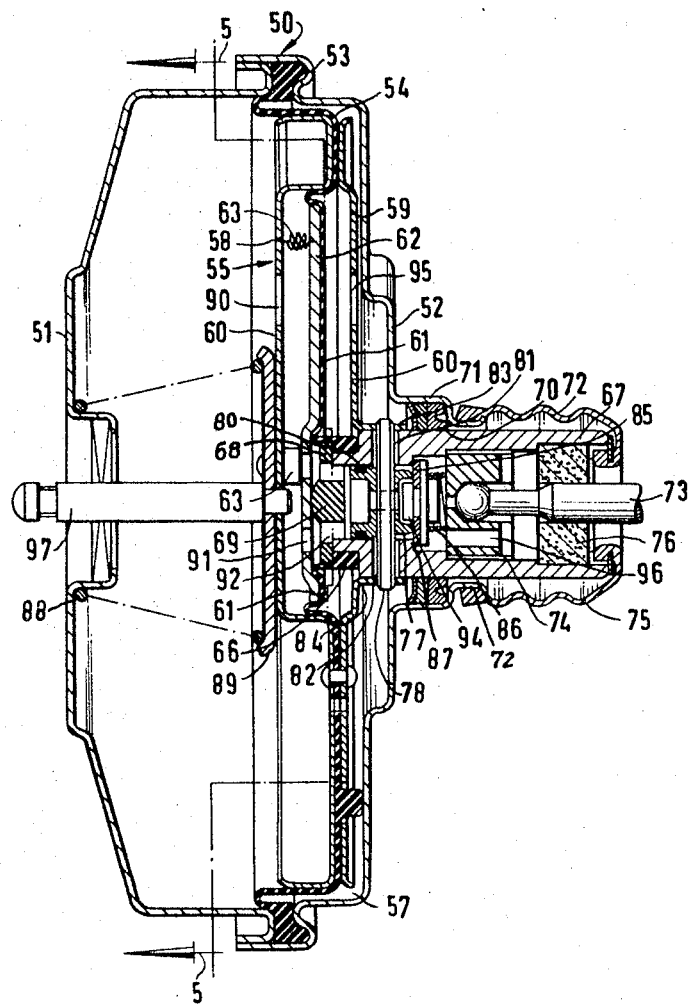
FIGURE 3 is a longitudinal section of a further booster of the vacuum suspended type.
Figure 4:
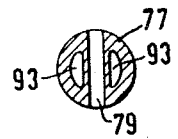
FIGURE 4 is a section through a vacuum valve incorporated in the booster illustrated in FIGURE 3.

In the booster illustrated in FIGURE 1, 10 is the housing or cylinder of the booster which is divided into a front constant pressure chamber 11 and a rear power chamber 12 by a movable wall 13. The movable wall may comprise a piston working in the cylinder or, as illustrated in the drawing, the movable wall is formed by a rigid piston 14 having a substantial clearance between its peripheral edge and the peripheral wall of the housing to which the piston is connected by a rolling diaphragm 15 forming a seal.

An input member 16, which may be a rod actuated by a pedal, at its inner end on the axis of the housing or cylinder of the booster carries and has a rocking engagement with an annular member 17 carrying a beam or plate 18 which forms a part of the movable wall 13.

The beam 18 is generally circular in plan view and is arranged eccentrically with respect to the axis of the booster, the centre of pressure of the beam being located between the axis of the booster and a point adjacent to the peripheral edge of the piston 14. A rolling diaphragm 19 forming a seal and carrying the beam connects the peripheral edge of the beam to the rear face of the piston 14. At a radially outermost point on its peripheral edge the beam is biassed by a spring 20 towards the piston 14 at that point, and at a position between the centre of pressure of the diaphragm 19 and the input member 16, the beam is adapted to rock on a fulcrum 21 on the rear face of the piston 14.

An annular passage 22 in the annular member 17 is in communication with the chamber 11 through a port 23 in the piston 14 and a communicating port 24 in the beam 18. The annular passage 22 also communicates with the chamber 12 by a port 25 in the beam controlled by a vacuum valve member 26 engageable with an annular seating 27 formed around the port 25 on the front face of the beam. The valve member 26 is coupled to an air valve member 28 controlling communication between an annular chamber 29 in the piston 14 and chamber 12 through a port 30. The valve member 28 is normally held in engagement with a valve seating around the port 30 by a spring 31.

An output member in axial alignment with the input member 16 comprises a rod 32 having an axial bore 33. The output member is guided for axial movement in a guide 34 and a seal 35 housed in an annular recess in the guide, the guide being mounted on the front end wall 36 of the housing.

The output member actuates a piston 37 of a master cylinder 38 with which the booster is combined. At its rear end the output member is received in the front face of the piston 14 and the axial bore 33 communicates with the chamber 29 in the piston 14.

In the inoperative or "balanced" condition abutments 39 on the rear face of the piston 14 are held in engagement with the rear end wall of the booster housing by a return spring 40. The spring 20 biases the beam 18 in a direction opposed to that in which it is moved by the input member 16 into engagement with a stop 41 on the piston 14. In this position the beam 18 is held away from the vacuum valve member 26 so that chamber 11, which is connected to a source of vacuum, is in communication with chamber 12 through ports 23 and 24, annular passage 22 and the port 25.

To energise the booster the input member which is sealed by a rolling diaphragm 42, and a boot 43, moves the beam 18 angularly about the fulcrum 21 in a direction to close the vacuum valve 26, 27 and cut off the power chamber 12 of the booster from vacuum. Further movement of the beam 18 opens the air valve 28 and admits air to the power chamber through an air filter 45 and the hollow input rod 32, and the differential pressure on the diaphragm 19 exerts a force on the beam 18 tending to move it angularly about the fulcrum 21 in a direction opposed to that in which it is moved by the input member 16. As the pressure increases the beam 18 is returned to a position in which the air valve 28 closes and the system remains in a position of equilibrium until the force exerted on the beam 18 by the input member 16 is increased or decreased.

The force exerted on the beam 18 by the differential pressure can be regarded as acting at the centre of pressure of the diaphragm 19 and the boost ratio, that is the ratio between the force exerted by the input member and the force generated by the booster, depends on the relative distances from the fulcrum 21 of the points at which these forces act.

Thus by moving the position of the fulcrum 21 relative to the beam 18 the boost ratio can be changed as desired without modifying any of the rest of the mechanism.

Figure 2:
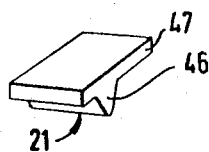
FIGURE 2 shows a construction of fulcrum adapted to be embodied in the booster illustrated in FIGURE 1.
Figure 5:
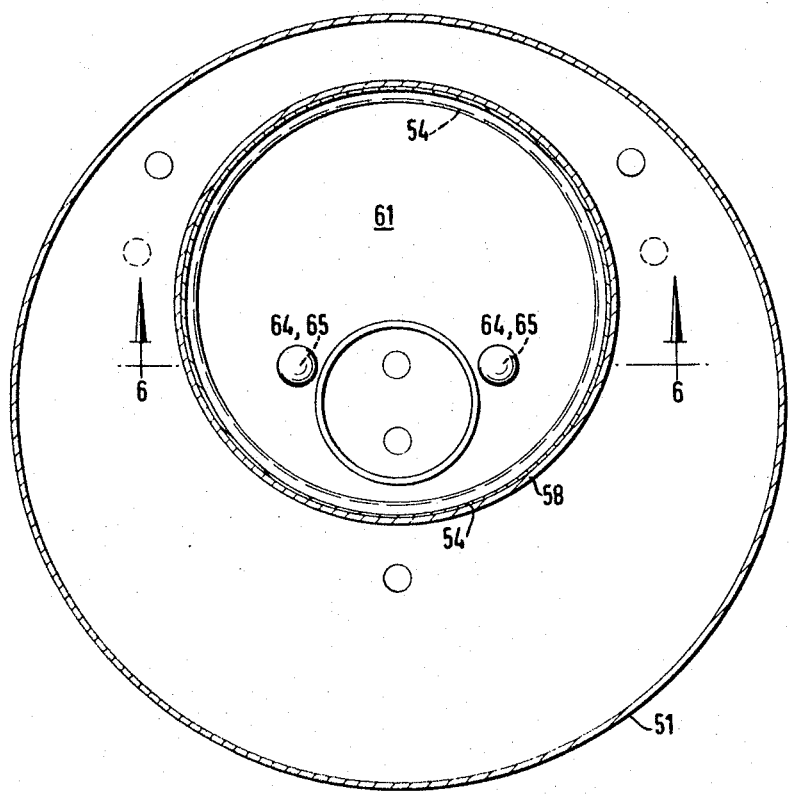
FIGURE 5 is a section on the line 5—5 of FIGURE 3.
Figure 6:
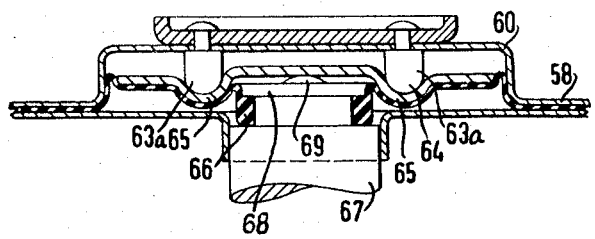
FIGURE 6 is a section on the line 6—6 of FIGURE 5.

The fulcrum 21 may, for example, be formed by a boss or projection 46 on a base 47 removably received in a recess 48 in the piston 14, and a number of such fulcrum members can be supplied with identical bases but having the bosses or projections located in different positions along the length of the base so that the boost ratio can be changed by turning a fulcrum member through 180° or substituting a different one (FIGURE 2).

Reaction or "feel" during the operation of the booster is fed back to the pedal through the beam 18 and tends to oppose the pedal force applied through the input member 16. The magnitude of the reaction is dependent upon and proportional to the magnitude of the pressure differential developed across the diaphragm 19.

In the event of failure of the booster the force applied to the input member 16 can be transmitted through the beam 18 to the piston 14 and so to the output rod 32.

In the booster illustrated in FIGURES 3–6, 50 is the housing or cylinder of the booster which is formed from two shells 51, 52 between which is clamped the outer peripheral rim 53 of a flexible diaphragm 54. The flexible diaphragm 54 forms a part of a movable wall generally indicated by 55 which divides the housing or cylinder into a front constant pressure chamber 56 and a rear power chamber 57. The diaphragm 54 at a position radially in from its peripheral rim is clamped between two dish-shaped pressings 58, 59 arranged in back to back relationship and forming a piston. Over a substantially circular area 60 which is offset from and eccentric with respect to the axis of the booster the pressings are deformed away from the diaphragm and away from each other, and a circular portion 61 of the diaphragm between the circular area of the pressings is supported by a lever in the form of a circular beam or plate 62. Adjacent to the radially outermost point on its peripheral edge the beam is biassed by a spring 63 towards the pressing 58 at that point. At a position between the centre of pressure of portion 61 of the diaphragm and the axis of the booster, the beam 62 is adapted to rock on a fulcrum on the rear face of the pressing 58. The fulcrum may be a single member located on a diameter of the circular area 60 of the pressing, which diameter passes through the axis of the booster, but preferably the fulcrum is formed by a pair of pins 63a having part spherical heads 64 which engage in complementary part spherical recesses 65 in the beam 62. The pins are carried by the pressings 58 and are spaced equally on opposite sides of that diameter and are both spaced from the axis of the booster by equal distances.

The diaphragm 54 at its radially inner edge has a rim 66 which is clamped between the forward end of a hollow sleeve 67 housing a control valve mechanism for the booster and a member 68 which at its forward end has a boss 69 adapted to engage the beam 62 at a position on the axis of the booster. The axis of the sleeve 67 is coaxial with the axis of the booster and is slidably received in a seal 70 housed in an annular recess 71 in a rearward extension 72 of the shell 52 of the booster casing.

An input member 73 which may be a rod actuated by a pedal is located on the axis of the booster and at its inner end the input member is in engagement with a member 74 screw-threaded into the sleeve. A flexible boot 75 connected between the outer end of the sleeve and the extension 72 of the shell 52 protects the seal 70 against the ingress of dirt, and dirt or other foreign bodies are prevented from entering the sleeve itself by a filter 76 through which air can pass and through which works the input member 73.

A valve spool 77 slidably arranged in the inner end of the sleeve adjacent to the member 68 is held in the sleeve by a pin 78 located at right angles to the axis of the booster and passing through a hole 79 in the valve spool 77, an annular seal 80 being carried by the valve spool at its inner end beyond the pin to form a seal between that part of the valve spool and the sleeve. At opposite ends the pin 78 projects through diametrically opposed axial slots 81, 82 in the wall of the sleeve 67, and the outer ends of the pin are received in diametrically opposed holes 83 in a rearwardly projecting annular axial flange 84 on the pressing 59. The arrangement is such that the sleeve 67 and the pin 78 can move axially relative to each other by an amount determined by the length of the slots 81, 82. In the sleeve between the rear end of the valve spool 77 and the member 74 is located a valve member 85 which is normally urged by a spring 86 into engagement with an annular shoulder 87 on the sleeve 67 forming a seating.

The chambers 56 and 57 on opposite sides of the movable wall are in communication through the valve mechanism housed in the sleeve 67. Normally the chamber 56 is in communication with vacuum from any convenient source such as an inlet manifold of a vehicle through a connection (not shown).

In the inoperative or "balanced" condition the sleeve 67 and the movable wall 55 are held in fully retracted positions by a return spring 88 acting between the shell 51 and a plate 89 mounted on the pressing 60, the movable wall abutting against the shell 52. The forward end of the slots 81 in the sleeve 67 engage with the pin 78 and the valve spool 77 is held away from the valve member 85. This permits chamber 56 to communicate with chamber 57 through a port 90 in the pressing 58 which port communicates with ports 91, 92 in the beam 62 and member 68 respectively and two parallel passages 93 through the valve spool 77. A space 94 between the valve spool 77 and the valve member 85 communicates with the chamber 57 through the slots 81 on the sleeve 67 and ports in the axial flanges 84 on the pressing 59. The portion 61 of the diaphragm between the circular area of the pressings is subjected to the pressure in chamber 57 through a port 95 in the pressing 59. In the inoperative or "balanced" condition as described above as both chambers 56 and 57 are in open communication they are both subjected to vacuum.

To energise the booster the input member 73 moves the sleeve 67 forwardly to move the valve member 85 into engagement with the valve spool 77 and cut off the power chamber 57 of the booster from vacuum. Simultaneously the lever 62 is rocked in a clockwise direction about the fulcrum 64. Upon further movement of the sleeve, the valve member 85 is carried away from its seating 87 in the sleeve and air from the air filter 76 and a passage 96 in the member 74 passes the valve seating 87 and enters the power chamber 57 by way of the slots 83 and the communicating parts in the flange 84. At the same time the lever 62 is rocked further in a clockwise direction and the combined force from the engagement of the boss 69 with the lever 62 and the differential pressure applied across the movable wall itself is fed to an output member in the form of a rod 97. The rod lies on the axis of the booster and in axial alignment with the input member 73 and the rod 97 operates the piston of an hydraulic master cylinder as described above with reference to the embodiment of FIGURES 1 and 2.

A force exerted by the differential pressure applied across the portion of the diaphragm 61 between the circular area of the pressings 58, 59 acts at substantially the centre of pressure of that portion and tends to rock the lever about its fulcrum 64 in a counterclockwise direction thereby providing a reaction or "feel" on the pedal to oppose the pedal force applied through the sleeve. The magnitude of the reaction or "feel" is dependent upon and proportional to the magnitude of the pressure differential developed across the portion 61 of the diaphragm supporting the lever 62.

I claim:
1. A fluid-pressure operated booster comprising a housing, a pressure responsive wall in the housing dividing the housing into a constant pressure chamber and a variable pressure power chamber, said pressure responsive wall being subjected to differential fluid pressure when the booster is energised and being movable in response to such a differential fluid pressures, a lever of substantially planar form formed by a part of the movable wall and comprising a beam, and a diaphragm carrying said beam of which one side is at all times exposed to a constant pressure and the other side is exposed to the pressure in the power chamber of the booster, a force output member on the axis of the booster, a force input member in axial alignment with said force output member and acting on said force output member through said lever, a fulcrum formed by another part of said movable wall and positioned between the axis of the booster and the centre of pressure of the lever only whereby on energisation of the booster the lever is adapted to move angularly about the fulcrum and apply to the input member a reaction force dependent upon the pressure differential developed across the movable wall, and valve means to control development of said pressure differential.

2. A booster as claimed in claim 1, wherein the beam is engaged by the input member at a point lying on the opposite side of the fulcrum from the centre of pressure of the diaphragm.

3. A booster as claimed in claim 1, wherein the beam is biassed by a spring urging the beam in a direction opposed to that in which the beam is moved by the input member.

4. A booster as claimed in claim 1, wherein the movable wall includes a piston having a susbtantial clearance between its peripheral edge and a peripheral wall of the housing of the booster to which the piston is connected by a first rolling diaphragm forming a seal, a generally circular beam forming the lever arranged eccentrically with respect ot the axis of the booster and located on the side of the piston adjacent to the input member, and a second diaphragm providing a seal between the peripheral edge of the beam and that side of the piston, one side of the second diaphragm being exposed at all times to a constant pressure through a port in the piston and the other side of the second diaphragm being exposed to the pressure in the power chamber of the booster.

5. A booster as claimed in claim 1, wherein the movable wall includes a piston having a substantial clearance between its peripheral edge and a peripheral wall of the housing of the booster comprising two members which over a substantially circular area offset from and eccentric with respect to the axis of the booster are deformed away from each other, a generally circular beam forming the lever located between the members at the deformed portions, and a diaphragm clamped between the members and forming a seal between the peripheral edge of the piston and the peripheral wall of the housing of which the portion of the diaphragm between the deformed circular portions of the members is supported by the beam, one side of the portion of the diaphragm between the members being exposed at all times to a constant pressure through a port in the adjacent member of the piston, and the other side of the portion of the diaphragm between the members being exposed to the pressure in the power chamber of the booster.

6. A booster as claimed in claim 5, wherein the members comprise dished-shaped pressings arranged in back-to-back relationship.

7. A booster comprising a housing, a pressure responsive wall in the housing dividing the housing into a constant pressure chamber and a variable pressure power chamber, said pressure responsive wall being subjected to differential fluid pressure when the booster is energised and being movable to augment an input force when the booster is energised, a lever formed by a part of the movable wall comprising a beam of substantially planar form, a diaphragm carrying said beam and forming a seal between said beam and the remainder of the movable wall, one side of the diaphragm being exposed at all times to pressure in said constant pressure chamber and the other side of the diaphragm being exposed to pressure in said power chamber, a force output member on the axis of the booster, a force input member comprising a pedal-operated push rod in axial alignment with said force output member and acting on said force output member through said lever, a fulcrum on a part of the movable wall about which the lever is adapted to move angularly when the booster is energised, said fulcrum being located between the axis of the booster and the centre of pressure of the lever only, an engagement between said input member and said beam at a position on the opposite side of said fulcrum from the centre of pressure of said diaphragm, whereby on energisation of the booster the lever rocks about the fulcrum and applies a reaction force to the pedal dependent upon the pressure differential developed across the diaphragm, and valve means to control development of said pressure differential.

8. A booster as claimed in claim 7, wherein said valve means are actuated by said input member through said lever.

9. A fluid-pressure operated booster comprising a housing, a pressure responsive wall in the housing dividing the housing into a constant pressure chamber and a variable pressure power chamber, said pressure responsive wall being subjected to differential fluid pressure when the booster is energised and being movable in response to such differential fluid pressures, a rigid lever of non-flexing construction formed by a part of the movable wall and comprising a rigid beam, and a diaphragm carrying said beam of which one side is at all times exposed to a constant pressure and the other side is exposed to the pressure in the power chamber of the booster, a force output member on the axis of the booster, a force input member in axial alignment with said force output member and acting on said force output member through said lever, a fulcrum formed by another part of said movable wall and positioned between the axis of the booster and the centre of pressure of the lever only whereby on energisation of the booster the lever is adapted to move angularly about the fulcrum and apply to the input member a reaction force dependent upon the pressure differential developed across the movable wall, and valve means to control development of said pressure differential.

10. A booster comprising a housing, a pressure responsive wall in the housing dividing the housing into a constant pressure chamber and a variable pressure power chamber, said pressure response wall being subjected to differential fluid pressure when the booster is energised and being movable to augment an input force when the booster is energised, a lever of non-flexing construction formed by a part of the movable wall and comprising a rigid beam, a diaphragm carrying said beam and forming a seal between said beam and the remainder of the movable wall, one side of the diaphragm being exposed at all times to pressure in said constant pressure chamber and the other side of the diaphragm being exposed to pressure in said power chamber, a force output member on the axis of the booster, a force input member comprising a pedal-operated push rod in axial alignment with said force output member and acting on said force output member through said lever, a fulcrum on a part of the movable wall about which the lever is adapted to move angularly when the booster is energised, said fulcrum being located between the axis of the booster and the centre of pressure of the lever only, an engagement between said input member and said beam at a position on the opposite side of said fulcrum from the centre of pressure of said diaphragm, whereby on energisation of the booster the lever rocks about the fulcrum and applies a reaction force to the pedal dependent upon the pressure differential developed across the diaphragm, and valve means to control development of said pressure differential.

References Cited

UNITED STATES PATENTS

| | | |
|---|---|---|
| 2,900,963 | 8/1959 | Ayers. |
| 2,990,815 | 7/1961 | Ayers. |
| 3,026,853 | 3/1962 | Stelzer. |
| 3,175,235 | 3/1965 | Randal. |
| 3,183,789 | 5/1965 | Stelzer. |

FOREIGN PATENTS 964,289   7/1964   Great Britain.

PAUL E. MASLOUSKY, Primary Examiner

U.S. Cl. X.R.

91—376; 92—99